United States Patent
Nesta et al.

(10) Patent No.: US 11,257,512 B2
(45) Date of Patent: Feb. 22, 2022

(54) ADAPTIVE SPATIAL VAD AND TIME-FREQUENCY MASK ESTIMATION FOR HIGHLY NON-STATIONARY NOISE SOURCES

(71) Applicant: SYNAPTICS INCORPORATED, San Jose, CA (US)

(72) Inventors: Francesco Nesta, Aliso Viejo, CA (US); Alireza Masnadi-Shirazi, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 30 days.

(21) Appl. No.: 16/735,575

(22) Filed: Jan. 6, 2020

(65) Prior Publication Data

US 2020/0219530 A1 Jul. 9, 2020

Related U.S. Application Data

(60) Provisional application No. 62/789,491, filed on Jan. 7, 2019.

(51) Int. Cl.
*G10L 25/84* (2013.01)
*H04R 1/40* (2006.01)
(Continued)

(52) U.S. Cl.
CPC .......... *G10L 25/84* (2013.01); *G06N 3/08* (2013.01); *G10L 15/16* (2013.01); *G10L 15/22* (2013.01);
(Continued)

(58) Field of Classification Search
CPC ........ H04R 1/406; H04R 3/005; H04R 5/027; H04R 2420/07; H04R 2430/03;
(Continued)

(56) References Cited

U.S. PATENT DOCUMENTS

| | | |
|---|---|---|
| 6,370,500 B1 | 4/2002 | Huang et al. |
| 2003/0231775 A1 | 12/2003 | Wark |

(Continued)

OTHER PUBLICATIONS

Dov, David et al., "Audio-Visual Voice Activity Detection Using Diffusion Maps," IEEE/ACM Transactions on Audio, Speech, and Language Processing, Apr. 2015, pp. 732-745, vol. 23, Issue 4, EEE, New Jersey, U.S.A.

(Continued)

*Primary Examiner* — Yogeshkumar Patel
(74) *Attorney, Agent, or Firm* — Paradice & Li LLP (57) ABSTRACT

Systems and methods include a first voice activity detector operable to detect speech in a frame of a multichannel audio input signal and output a speech determination, a constrained minimum variance adaptive filter operable to receive the multichannel audio input signal and the speech determination and minimize a signal variance at the output of the filter, thereby producing an equalized target speech signal, a mask estimator operable to receive the equalized target speech signal and the speech determination and generate a spectral-temporal mask to discriminate a target speech from noise and interference speech, and a second activity voice detector operable to detect voice in a frame of the speech discriminated signal. An audio input sensor array including a plurality of microphones, each microphone generating a channel of the multichannel audio input signal. A sub-band analysis module operable to decompose each of the channels into a plurality of frequency sub-bands.

18 Claims, 6 Drawing Sheets

(51) Int. Cl.
| | |
|---|---|
| *H04R 3/00* | (2006.01) |
| *H04R 5/027* | (2006.01) |
| *G06N 3/08* | (2006.01) |
| *G10L 15/16* | (2006.01) |
| *G10L 25/21* | (2013.01) |
| *G10L 15/22* | (2006.01) |
| *G10L 25/18* | (2013.01) |

(52) U.S. Cl.
CPC ............. *G10L 25/18* (2013.01); *G10L 25/21* (2013.01); *H04R 1/406* (2013.01); *H04R 3/005* (2013.01); *H04R 5/027* (2013.01)

(58) Field of Classification Search
CPC ......... G10L 15/16; G10L 15/22; G10L 25/21; G10L 25/84; G10L 25/18; G10L 25/30; G10L 25/60; G10L 25/78; G10L 2025/786; G10L 21/0216; G10L 21/0264; G10L 21/0224; G06N 3/08
See application file for complete search history.

(56) References Cited

U.S. PATENT DOCUMENTS

| | | |
|---|---|---|
| 2005/0049865 A1 | 3/2005 | Yaxin et al. |
| 2007/0021958 A1 | 1/2007 | Visser et al. |
| 2008/0082328 A1 | 4/2008 | Lee |
| 2008/0147414 A1 | 6/2008 | Son et al. |
| 2010/0017202 A1 | 1/2010 | Sung et al. |
| 2012/0130713 A1* | 5/2012 | Shin .................. G10L 25/78 704/233 |
| 2013/0046536 A1 | 2/2013 | Lu et al. |
| 2014/0126745 A1* | 5/2014 | Dickins .................. H04R 3/02 381/94.3 |
| 2014/0180674 A1 | 6/2014 | Neuhauser et al. |
| 2014/0180675 A1 | 6/2014 | Neuhauser et al. |
| 2014/0330556 A1 | 11/2014 | Resch et al. |
| 2014/0358265 A1 | 12/2014 | Wang et al. |
| 2015/0032446 A1 | 1/2015 | Dickins et al. |
| 2015/0094835 A1 | 4/2015 | Eronen et al. |
| 2016/0078879 A1 | 3/2016 | Lu et al. |
| 2016/0093290 A1 | 3/2016 | Lainez et al. |
| 2016/0093313 A1* | 3/2016 | Vickers .................. G10L 25/60 704/232 |
| 2017/0092297 A1 | 3/2017 | Sainath et al. |
| 2017/0105080 A1 | 4/2017 | Das et al. |
| 2017/0287489 A1 | 10/2017 | Biswal et al. |
| 2018/0025730 A1 | 1/2018 | Giletti |
| 2018/0158463 A1 | 6/2018 | Ge et al. |
| 2018/0166067 A1 | 6/2018 | Dimitriadis et al. |
| 2018/0182411 A1* | 6/2018 | Kaskari ................ G10L 19/008 |

OTHER PUBLICATIONS

Drugman, Thomas et al., "Voice Activity Detection: Merging Source and Filter-based Information," IEEE Signal Processing Letters, Feb. 2016, pp. 252-256, vol. 23, Issue 2, IEEE.

Ghosh, Prasanta Kumar et al., "Robust voice activity detection using long-term signal variability," IEEE Transactions on Audio, Speech, and Language Processing, Mar. 2011, 38 Pages, vol. 19, Issue 3, IEEE, New Jersey, U.S.A.

Graf, Simon et al., "Features for voice activity detection: a comparative analysis," EURASIP Journal on Advances in Signal Processing, Dec. 2015, 15 Pages, vol. 2015, Issue 1, Article No. 91.

Hughes, Thad et al., "Recurrent Neural Networks for Voice Activity Detection," 2013 IEEE International Conference on Acoustics, Speech and Signal Processing, May 26-31, 2013, DD. 7378-7382, IEEE.

Kang, Tae Gyoon et al., "DNN-Based Voice Activity Detection with Local Feature Shift Technique," 2016 Asia-Pacific Signal and Information Processing Association Annual Summit and Conference (APSIPA), Dec. 13-16, 2016,4 Pages IEEE, Jeju, South Korea.

Kim, Chanwoo, et al., "Power-Normalized Cepstral Coefficients (PNCC) for Robust Speech Recognition," IEEE Transactions on Audio, Speech, and Language Processing, Jul. 2016, pp. 1315-1329, vol. 24, Issue 7, IEEE, New Jersey, U.S.A.

Kim, Jaebok et al., "Deep Temporal Models using Identity Skip-Connections for Speech Emotion Recognition," Oct. 23-27, 2017, 8 pages.

Kinnunen, Tomi et al., "Voice Activity Detection Using MFCC Features and Support Vector Machine," Int. Cont. on Speech and Computer (SPECOM07), 2007, 4 Pages, vol. 2, Moscow, Russia.

Li, Xiaofei et al., "Voice Activity Detection Based on Statistical Likelihood Ratio With Adaptive Thresholding," 2016 IEEE International Workshop on Acoustic Signal Enhancement (IWAENC), Sep. 13-16, 2016, pp. 1-5, IEEE, Xi'an, China.

Ma, Yanna et al., "Efficient voice activity detection algorithm using long-term spectral flatness measure," EURASIP Journal on Audio, Speech, and Music Processing, Dec. 2013, 18 Pages, vol. 2013, Issue 1, Article No. 87, Hindawi Publishing Corp., New York, U.S.A.

Mousazadeh, Saman et al., "Voice Activity Detection in Presence of Transient Noise Using Spectral Clustering," IEEE Transactions on Audio, Speech, and Language Processing, Jun. 2013, pp. 1261-1271, vol. 21, No. 6, IEEE, New Jersey, U.S.A.

Ryant, Neville et al., "Speech Activity Detection on YouTube Using Deep Neural Networks," Interspeech, Aug. 25-29, 2013, pp. 728-731, Lyon, France.

U.S. Appl. No. 15/832,709, filed Dec. 5, 2017, pp. 1-35.

Wang, Longbiao et al., "Phase Aware Deep Neural Network for Noise Robust Voice Activity Detection," IEEE/ACM, Jul. 10-14, 2017, pp. 1087-1092.

Written Opinion and International Search Report for International App. No. PCT/US2018/063937, dated Mar. 20, 2019, 11 pages.

Ying, Dongwen, et al., "Voice Activity Detection Based on an Unsupervised Learning Framework," IEEE Transactions on Audio, Speech, and Language Processing, Nov. 2011, pp. 2624-2633, vol. 19, Issue 8, IEEE, New Jersey, U.S.A.

* cited by examiner

ADAPTIVE SPATIAL VAD AND TIME-FREQUENCY MASK ESTIMATION FOR HIGHLY NON-STATIONARY NOISE SOURCES

CROSS-REFERENCE TO RELATED APPLICATIONS

This application claims priority to and the benefit of U.S. Provisional Patent Application No. 62/789,491 filed Jan. 7, 2019 and entitled "ADAPTIVE SPATIAL VAD AND TIME-FREQUENCY MASK ESTIMATION FOR HIGHLY NON-STATIONARY NOISE SOURCES", which is hereby incorporated by reference in its entirety.

TECHNICAL FIELD

The present application, in accordance with one or more embodiments, relates generally to systems and methods for audio signal detection and processing and, more particularly, for example, to voice activity detection systems and methods.

BACKGROUND

Voice Activity Detection (VAD) is used in various speech communication systems, such as speech recognition systems, noise reduction systems, and sound source localization systems. In many applications, audio signals are received through one or more microphones that sense acoustic activity in a noisy environment. The sensed audio signals may include speech to be detected and various noise signals (including non-target speech) that degrade the speech intelligibility and/or decrease the VAD performance. Conventional VAD techniques may also require relatively large processing or memory resources that are not practical for real time voice activity detection in low power, low cost devices, such as mobile phones, smart speakers and laptop computers. In view of the foregoing, there is a continued need in the art for improved VAD systems and methods.

SUMMARY

Improved systems and methods for detecting a target audio signal, such as a target person's voice, in a noisy audio signal, are disclosed herein. In one or more embodiments, a system includes a sub-band analysis module, an input voice activity detector, a constrained minimum variance adaptive filter, a mask estimator and a spatial VAD.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Disclosed herein are improved systems and methods for detecting voice activity in a noisy environment.

Despite recent progress, speech recognition in noisy conditions is still a challenging task. In a multi-microphone setup, several multichannel speech enhancement algorithms have been proposed, including algorithms including adaptive and non-adaptive beamforming, blind source separation based on independent component analysis or independent vector analysis, and multichannel non-negative matrix factorization. One promising method in the field of automatic speech recognition is a maximum signal-to-noise (SNR) beamformer, also known as Generalized Eigen Value (GEV) beamformer, which aims to optimize a multichannel filter to maximize the output SNR. One component used for implementing an on-line maximum SNR beamformer algorithm is an estimator of noise and input covariance matrices. The estimation is generally supervised by voice activity detection or through a deep neural network (DNN) predicting spectral-temporal masks correlated to the speech activity. The VAD (or the DNN-mask) has the goal to identify parts of the signal where there is a high confidence of observing noise in isolation, to update the noise covariance matrix. It is also required to identify parts of the signal where the noise overlaps the target speech so that the input noisy covariance matrix can be updated.

One drawback of existing systems is that VAD and DNN-mask estimators are designed to discriminate speech from "non-speech" noise. However, in many real-world scenarios the noise source (e.g., a television or radio) could also emit audio containing speech parts which would produce false positives and eventually degrade the overall performance of the noise reduction. In the present disclosure, improved systems and methods are disclosed that produce a multichannel VAD prediction and a spectral-temporal mask to discriminate between target speech and interfering speech emitted by a noise source. For example, interfering noise may be produced by a TV playing a movie, a show or other media with audio content. The noise in this scenario will often include a mixture of speech and non-speech sounds, such as music or other audio effects.

In various embodiments, a method for voice activity detection includes estimating a constrained adaptive filter aimed at minimizing the output variance without explicitly defining the target speech direction. The filter is trained when there is a high confidence that the audio does not belong to the "speech" class. This supervision may be obtained through a deep neural network-based voice activity detector trained to discriminate speech-from non-speech audio. The multichannel filter estimation may be equivalent to an estimate of the relative transfer function (RTF) of the noise source. Because the filter output is minimized for audio emitted by the same noise source, it will also be minimized when there is speech in the noise. Therefore, the discrimination between target and interfering speech is possible. In some embodiments, the method includes running a power-based VAD at the output of the adaptive filter. The output of the filter may also be used to estimate a sub-band mask identifying time-frequency points, which can be further used to supervise the noise reduction methods.

The methods disclosed herein have been applied successfully in supervising two-channel speech enhancement in difficult noise scenarios, such as a speaker uttering a trigger word in a loud TV at −10 dB SNR, where the TV noise was playing a movie including some speech. Keyword recognition performance improvement has been measured moving the average hit rate scores from about 30% (without spatial VAD) to over 80% (with spatial VAD). Furthermore, the methods disclosed herein have been successfully used to supervise the direction of arrival (DOA) estimation, allowing position tracking of a target speaker in −10 dB SNR conditions with highly non-stationary noise.

Technological differences and advantages compared to other solutions will now be described. Existing single-channel based methods rely on the nature of the sound itself in the audio signal to produce a prediction of whether an input frame includes speech or only non-speech noise. These methods cannot discriminate between target speech and interfering speech because both belong to the same sound class. Any detected speech, whether from a target user providing voice commands or interfering speech, may be classified as speech in these systems.

Existing multichannel-based methods are typically based on strong geometrical assumptions of the location of a target speaker. For example, the target speaker may be assumed to be (i) closer to one of the microphones, (ii) in a predefined spatial region, and/or (iii) producing more coherent speech. These assumptions are not practical in many applications, such as smart speaker applications which allow for 360-degree far-field voice control or environments with coherent noise (e.g., speech from a television or radio).

In contrast to existing voice activity detectors, the systems and methods disclosed herein exploit both the nature of the sound and its unique spatial fingerprint in the 3D space, producing high speech/noise discrimination. In addition, the systems and methods of the present disclosure do not require prior assumptions on the geometry or speaker location, providing more flexibility for far-field applications than existing systems. In various embodiments, a supervised adaptive spatial voice activity detector is used and is specifically adapted to remove false positives caused by speech sounds emitted from a noise source.

Figure 1:
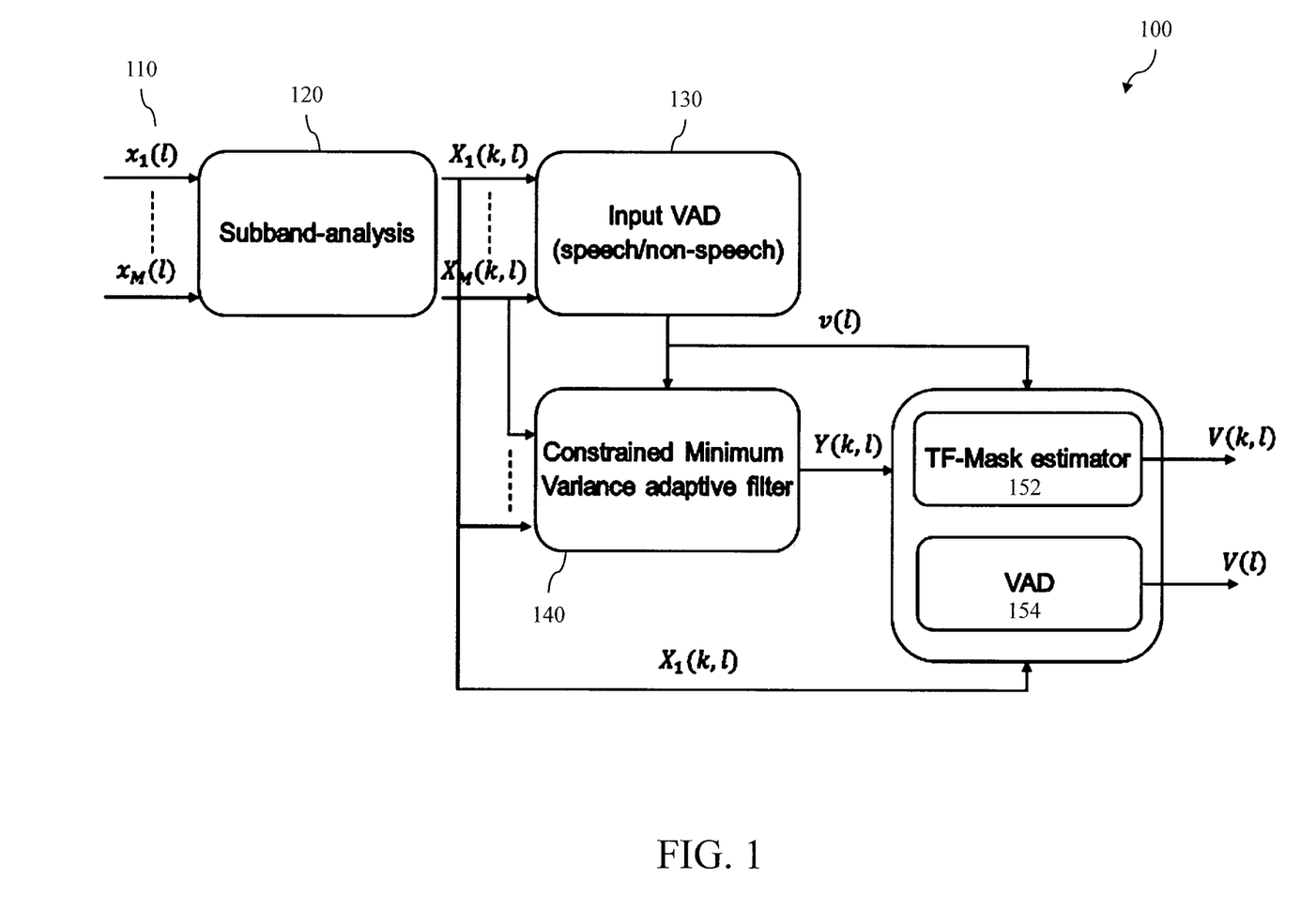
FIG. 1 illustrates an example system architecture of an adaptive spatial voice activity detection system, in accordance with one or more embodiments of the present disclosure.

Referring to FIG. 1, an example system 100 will now be described in accordance with various embodiments. The system 100 receives a multichannel audio input signal 110, which is processed through a sub-band analysis module 120. In some embodiments, the multichannel audio input signal 110 is generated from audio input components, including a plurality of audio sensors (e.g., a microphone array) and audio input processing circuitry. The multichannel audio input signal 110 includes plurality of audio channels, M, divided into a stream of frames, l. The sub-band analysis module 120 divides the frequency spectrum of audio channel into a plurality of frequency sub-bands, $X_i(k, l)$ (e.g., using a Fourier transform process). The system 100 further includes an input voice activity detector (VAD) 130, a constrained minimum variance adaptive filter 140, a time-frequency (TF)-mask estimator 152 and a spatial voice activity detector VAD 154.

The input VAD 130 receives the output of the sub-band analysis module 120, $X_i(k, l)$, and identifies time-instants (e.g., audio frames) where non-speech like noise is detected in isolation (e.g., without speech). In some embodiments, the input VAD 130 is tuned to produce more false alarms than false rejections of speech activity. In other words, a goal of the input VAD 130 is to identify frames where the determination that speech is absent is made with a high degree of confidence. In various embodiments, the input VAD 130 may include power-based speech detection techniques, which may include machine learning data-based classifiers such as a deep neural network, support vector machine and/or Gaussian Mixture Models trained to discriminate between speech and non-speech audio. In one embodiment, the input VAD 130 may implement an embodiment of the method proposed in co-pending application Ser. No. 15/832,709, titled "VOICE ACTIVITY DETECTION SYSTEMS AND METHODS," which is incorporated by referenced in its entirety herein.

The input VAD 130 outputs a variable v(l) defining the state of the input VAD 130 for the observed frame l. In one embodiment, a value equal to "1" indicates that an observed frame is determined to include speech, and a value equal to "0" indicates an absence of speech in an observed frame. In other embodiments, the input VAD 130 may include other conventional VAD systems and methods operable to produce a time-based voice activity determination, including VADs that analyze and produce voice activity determinations based one or more channels, sub-bands and/or frames of the multichannel signal.

The constrained minimum variance adaptive filter 140 receives the multichannel sub-band signals $X_i(k, l)$ and the speech determination, v(l), and is operable to estimate an adaptive filter to minimize the signal variance at its output. A frequency-domain implementation is disclosed herein for simplicity and effectiveness, but the present disclosure is not limited to this approach. In the illustrated embodiment, for each channel i, the time-domain signals $x_i(t)$ of the present embodiment are transformed to an under-sampled time-frequency domain representation by the sub-band-analysis module 120. This can be obtained by applying a sub-band analysis or a short-time Fourier transform:

$$X_i(k,l) = TF([x_i(t)], \forall i=1, \ldots, M$$

$$X(k,l) = [X_1(k,l), \ldots, X_M(k,l)]^T$$

where M indicates the number of input channels (M>1). For the sub-band k, the output of the filter may be defined as $$Y(k,l) = G(k)^H X(k,l)$$

where G(k) is optimized to minimize the expectation of the output variance $E[|Y(k)|^2]$ when only the noise source is active (e.g., when v(l) indicates that no speech is detected):

$$\hat{G}(k) = \underset{G}{\mathrm{argmin}} E[|Y(k)|^2], \text{ subject to } |G(k)^H e_1| = 1$$

under the constraint $|G^H(k)e_1|=1$, with $e_1=[1 \ldots 0]^T$, which in some embodiments is used to prevent $\hat{G}(k)$ from becoming a vector of all zeroes. Note, in the above equation the expectation operator $E[\ ]$ is approximated with a time average over the time frames 'l'. A closed-form solution for the optimization is $$\hat{G}(k) = \frac{R_n^{-1}(k)e_1}{e_1^T R_n^{-1}(k)e_1}$$

where $R_n(k)$ is the covariance of the noise which is computed as:

$$R_n(k) = \sum_l (1-v(l))X(k,l)X(k,l)^H$$

In an on-line implementation the covariance matrix is updated with the frames l and can be estimated with a first-order recursive smoothing as $$R_n(k,l+1) = \alpha(l)R_n(k,l) + (1-\alpha(l))X(k,l)X(k,l)^H$$

with $\alpha(l)=\max(\alpha, v(l))$, where $\alpha$ is a smoothing constant (<1).

In some embodiments, an alternative way to estimate the filter $G(k)$ is to impose the following constrained filter structure $$G(k)=[1,-H(k)]^T$$

$$H(k)=[G_2(k),\ldots,G_M(k)]$$

and optimize $$\hat{H}(k) = \underset{H}{\mathrm{argmin}} E[|Y|^2]$$

without any imposing any constraint in the adaptation. The adaptive solution to this optimization problem can be obtained by using a Normalized Least Mean Square (NLMS) which can be formulated as $$Y(k,l) = G(k)^H X(k,l)$$

$$H(k,l+1) = H(k,l) + \mu(1-v(l))Y(k,l)^H \frac{Z(k,l)}{Z(k,l)^H Z(k,l) + \beta|Y(k,l)|^2}$$

where $\mu$ the adaptation step-size, $Z(k,l)=[X_2(k,l),\ldots,X_M(k,l)]^T$ and the term $\beta|Y(k,l)|^2$ (with $\beta>1$) is added to stabilize the learning and avoid numerical divergence.

The output variance of the constrained minimum variance adaptive filter $|Y(k,l)|^2$ is minimized for frames containing audio emitted by the noise source. The attenuation of the filter is unrelated to the nature of the sound but only depends on the spatial covariance matrix and therefore the output will be small also for noise parts containing interfering speech. On the other hand, audio emitted from a different point in the space will have a different spatial covariance matrix and therefore will not be attenuated as much as the noise source.

Following the NLMS formulation, for the case of M=2 and one coherent noise source, the estimated filters $G_i(k)$ (i>2) can be considered Relative Transfer Functions between the first and the i-th microphone.

The noise with covariance $R_n(k)$ is attenuated at the output $Y(k,l)$, but this signal is not directly used as an enhanced version of the target speech in the disclosed embodiments. In various embodiments, no "distortionless" constraint is imposed as usually done in a minimum variance distortionless response (MVDR) beamformer, since the target speaker direction or its RTF is not known in advance. Therefore, in the illustrated embodiment, $Y(k,l)$ will contain an equalized version of the target speech, with a spectral distortion depending on the similarity between the spatial covariance of the target speech and the spatial covariance of the noise. The SNR improvement at the output $Y(k,l)$ is sufficiently large for allowing an estimation of speech-related TF activity masks, through TF-mask estimator 152, without explicitly addressing the estimation of the true target speech variance.

First, for each sub-band k, a reference feature signal is computed from $|X_1(k,l)|$ and $|Y(k,l)|$ as follows:

$$F(k,l)=f(|X_1(k,l)|,|Y(k,l)|).$$

In various embodiments, a possible formulation for $F(k,l)$ could be $$F(k,l) = \frac{|Y(k,l)|^2}{|X_1(k,l)|}$$

which is in practice the output magnitude weighted by the magnitude transfer function of the filter. However, alternative formulations are also possible.

For each sub-band k, the activity of target speech may be determined by tracking the power level of the signal $F(k,l)$ and detecting the non-stationary signal parts. A single-channel power based VAD can then be applied to each signal $F(k,l)$ to produce a mask $V(k,l)=1$, if speech is detected 0, otherwise In this embodiment an example sub-band VAD is shown, but the disclosure should not be considered limited to this formulation since many alternative algorithms are available.

For each sub-band k, the noise floor may be estimated by a dual-rate smoothing as $$N(k,l+1)=\gamma N(k,l)+(1+\gamma)F(k,l)$$

with $\gamma=\gamma_{up}$, if $|F(k,l)| \geq N(k,l+1)$ $\gamma=\gamma_{down}$, if $|F(k,l)| < N(k,l+1)$ with $\gamma_{up} \gg \gamma_{down}$, smoothing constants.

Then a target speech mask may be computed as $$V(k,l) = 20\log10\left[\frac{F(k,l)}{N(k,l)} - 1\right] \geq \text{SNR\_threshold}$$

$$V(k,l) = 0, \text{ if } \left[\frac{F(k,l)}{N(k,l)} - 1\right] < 0$$

where SNR_threshold is a tunable parameter. In the illustrated embodiment, it is assumed that the adaptive filter can reduce the noise output variance under the noise floor, thus generating a stationary noise residual. This is possible if the noise is coherent and the sub-band signal representation has a high enough resolution to accurately model the acoustic reverberation. In another embodiment, this assumption is relaxed, and a method based on tracking the distribution of the relative power levels is adopted such as described in Ying, Dongwen, et al. "Voice activity detection based on an unsupervised learning framework." *IEEE Transactions on Audio, Speech, and Language Processing* 19.8 (2011): 2624-2633, which is incorporated herein by reference.

A frame based spatial VAD can be computed by integrating the feature signal F(k, l) (e.g., from the TF-mask estimator 152) into a single signal F(l)

$$F(l) = \sum_k F(k, l), \text{ with } k \in K$$

where K is a subset of frequencies, and applying a single channel VAD criteria on F(l) to obtain a binary frame-based decision V(l). In some embodiments, V(k, l) can be also directly applied for each sub-band as $$V(l) = \Sigma_k V(k,l) > \text{threshold}.$$

In another embodiment, the full signal F(k, l) may be used to produce a prediction V(l), e.g. by using hard-engineered features extracted from F(k, l) or using a data-based maximum likelihood method (e.g. deep neural networks, Gaussian Mixture Models, support vector machines, etc.).

Figure 2:
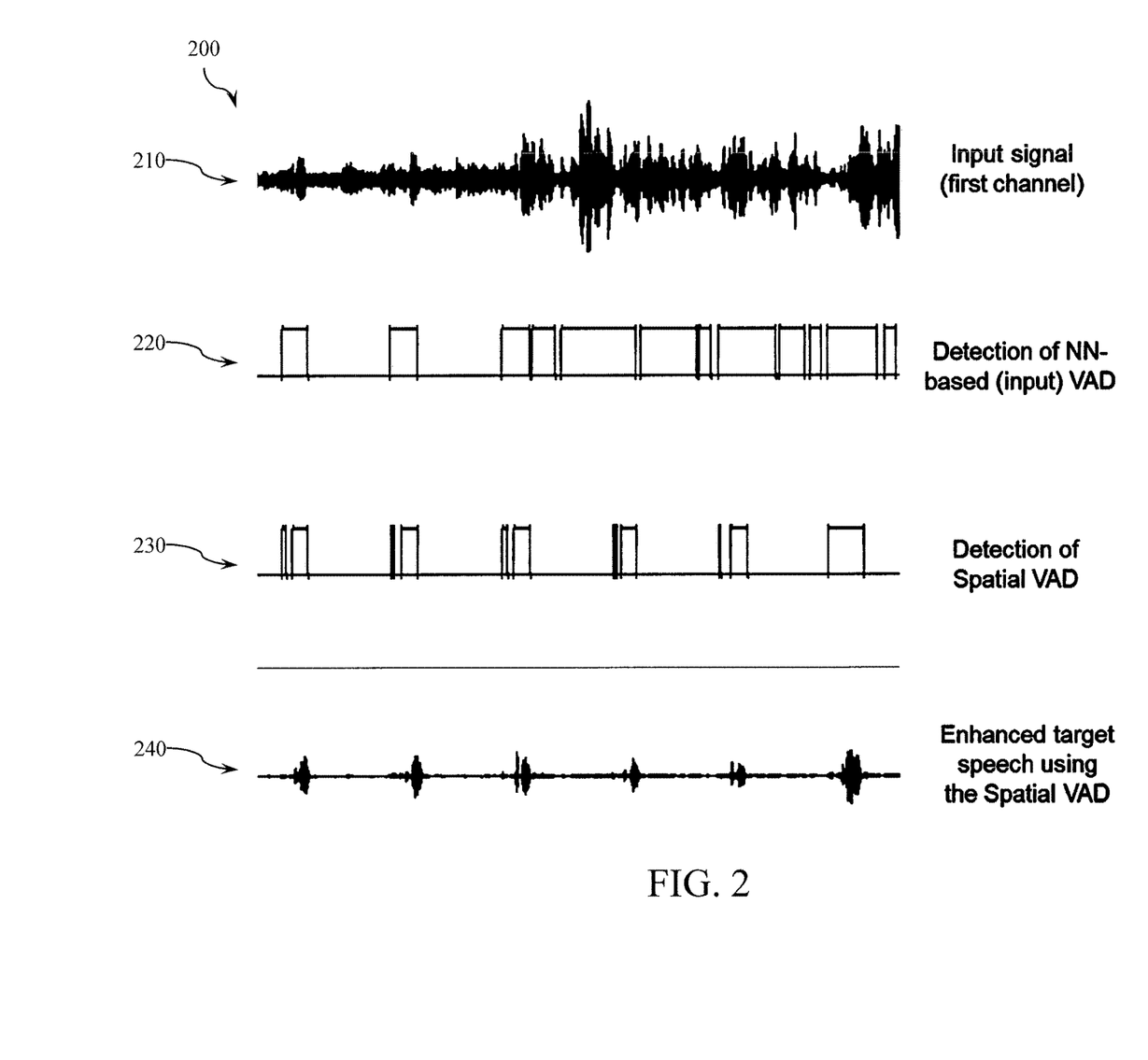
FIG. 2 illustrates example audio signals generated by components of an adaptive spatial voice activity detection system, in accordance with one or more embodiments of the present disclosure.

Referring to FIG. 2, example audio signals 200 generated by components of an adaptive spatial voice activity detection system, in accordance with one or more embodiments of the present disclosure, will now be described. In operation, a multichannel audio signal is received through a plurality of input sensors. A first channel of the input audio signal 210 is illustrated and may include target speech and noise (both non-target speech and non-speech noise). The input voice activity detector (e.g., input VAD 130) detects frames where there is a high likelihood that speech is not present and outputs a "0" for non-speech frames, and "1" for speech frames as illustrated, for example, in signal 220. The audio processing then proceeds to detect target speech activity from non-target speech activity and output an indication of "0" for no target speech, and "1" for detected target speech, as illustrated in signal 230. In some embodiments, the audio signal may include a loud non-stationary noise source (e.g., TV signal) that may be identified as non-target speech by the spatial VAD as previously discussed herein. The input audio signal 210 is then processed using detection information from the spatial VAD (e.g., signal 230) to generate an enhanced target speech signal 240.

Figure 3:
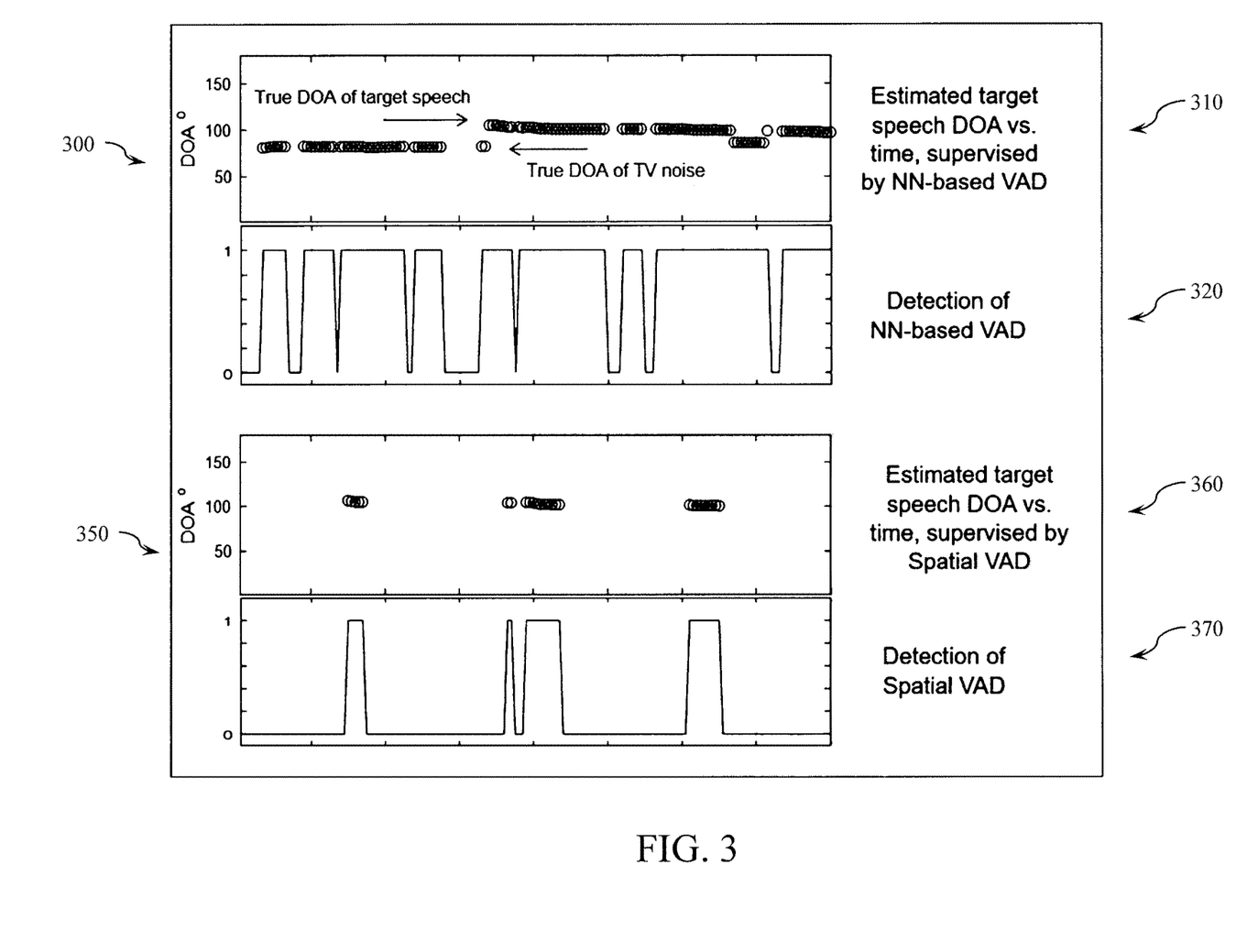
FIG. 3 illustrates example target speech processing including direction of arrival, in accordance with one or more embodiments of the present disclosure.

FIG. 3 illustrates example target speech processing including direction of arrival processing, in accordance with one or more embodiments of the present disclosure. Chart 300 illustrates an example estimated direction of arrival for speech sources for each frame using a neural network-based voice activity detector. The speech direction of arrival is illustrated in chart 310 and shows both target speech (e.g., a person providing voice commands) and other speech generated by a noise source (e.g., speech detected from a television). The VAD outputs corresponding voice activity decisions as illustrated in chart 320, for example, which shows speech detected in all time frames that include target speech and/or speech generated by the TV. The bottom chart 350 illustrates an example of applying the spatial voice activity detector to the task of direction of arrival (DOA) estimation of a target speech when loud noise (e.g., TV noise) is present. In this case, target speech in chart 360 is detected while non-target speech (e.g., TV noise) is ignored, providing improved voice activity detection, for example as illustrated in chart 370.

Figure 4:
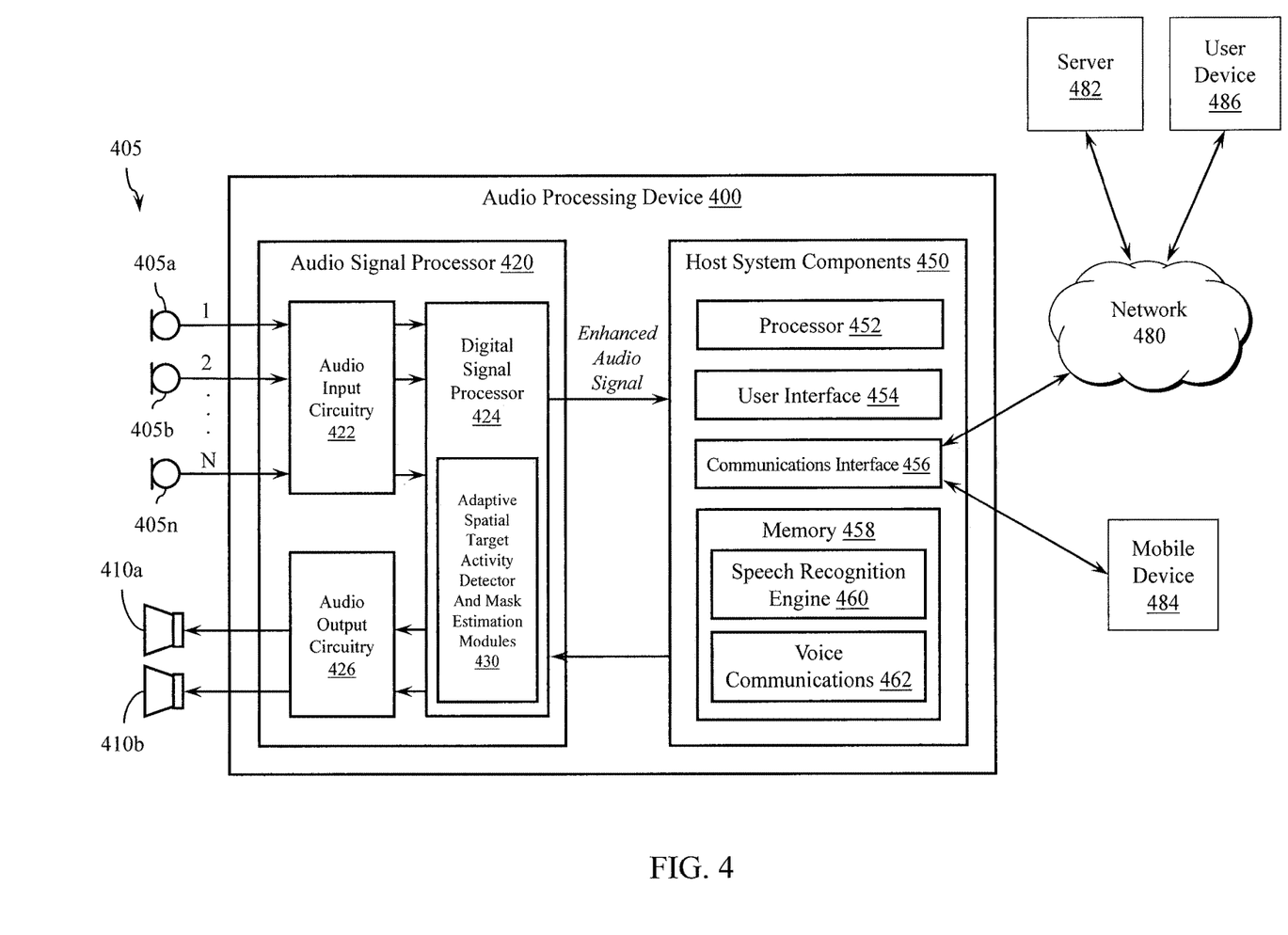
FIG. 4 illustrates an example system including an implementation of adaptive spatial voice detection, in accordance with one or more embodiments of the present disclosure.

FIG. 4 illustrates an audio processing device 400 including spatial voice activity detection according to various embodiments of the disclosure. The audio processing device 400 includes an input for an audio sensor array 405, an audio signal processor 420 and host system components 450.

The audio sensor array 405 comprises one or more sensors, each of which may convert sound waves into an audio signal. In the illustrated environment, the audio sensor array 405 comprises a plurality of microphones 405a-405n, each generating one audio channel of a multi-channel audio signal.

The audio signal processor 420 includes the audio input circuitry 422, a digital signal processor 424 and optional audio output circuitry 426. In various embodiments the audio signal processor 420 may be implemented as an integrated circuit comprising analog circuitry, digital circuitry and the digital signal processor 424, which is operable to execute program instructions stored in firmware. The audio input circuitry 422, for example, may include an interface to the audio sensor array 405, anti-aliasing filters, analog-to-digital converter circuitry, echo cancellation circuitry, and other audio processing circuitry and components as disclosed herein. The digital signal processor 424 is operable to process a multichannel digital audio signal to generate an enhanced audio signal, which is output to one or more host system components 450. In various embodiments, the multichannel audio signal includes a mixture of noise signals and at least one desired target audio signal (e.g., human speech), and the digital signal processor 424 is operable to isolate or enhance the desired target signal, while reducing the undesired noise signals. The digital signal processor 424 may be operable to perform echo cancellation, noise cancellation, target signal enhancement, post-filtering, and other audio signal processing functions. The digital signal processor 424 may further include adaptive spatial target activity detector and mask estimation modules 430, operable to implement one or more embodiments of the systems and methods disclosed herein in FIGS. 1-3 & 5-6.

The digital signal processor 424 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The digital signal processor 424 is operable to interface and communicate with the host system components 450, such as through a bus or other electronic communications interface.

The optional audio output circuitry 426 processes audio signals received from the digital signal processor 424 for output to at least one speaker, such as speakers 410a and 410b. In various embodiments, the audio output circuitry 426 may include a digital-to-analog converter that converts one or more digital audio signals to corresponding analog signals and one or more amplifiers for driving the speakers 410a-410b.

The audio processing device 400 may be implemented as any device operable to receive and detect target audio data, such as, for example, a mobile phone, smart speaker, tablet, laptop computer, desktop computer, voice-controlled appliance, or automobile. The host system components 450 may comprise various hardware and software components for operating the audio processing device 400. In the illustrated embodiment, the system components 450 include a processor 452, user interface components 454, a communications interface 456 for communicating with external devices and networks, such as network 480 (e.g., the Internet, the cloud, a local area network, or a cellular network) and mobile device 484, and a memory 458.

The processor 452 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 450 are operable to interface and communicate with the audio signal processor 420 and the other system components 450, such as through a bus or other electronic communications interface.

It will be appreciated that although the audio signal processor 420 and the host system components 450 are shown as incorporating a combination of hardware components, circuitry and software, in some embodiments, at least some or all of the functionalities that the hardware components and circuitries are operable to perform may be implemented as software modules being executed by the processor 452 and/or digital signal processor 424 in response to software instructions and/or configuration data, stored in the memory 458 or firmware of the digital signal processor 424.

The memory 458 may be implemented as one or more memory devices operable to store data and information, including audio data and program instructions. Memory 458 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 452 may be operable to execute software instructions stored in the memory 458. In various embodiments, a speech recognition engine 460 is operable to process the enhanced audio signal received from the audio signal processor 420, including identifying and executing voice commands. Voice communications components 462 may be operable to facilitate voice communications with one or more external devices such as a mobile device 484 or user device 486, such as through a voice call over a mobile or cellular telephone network or a VoIP call over an IP (internet protocol) network. In various embodiments, voice communications include transmission of the enhanced audio signal to an external communications device.

The user interface components 454 may include a display, a touchpad display, a keypad, one or more buttons and/or other input/output components operable to enable a user to directly interact with the audio processing device 400.

The communications interface 456 facilitates communication between the audio processing device 400 and external devices. For example, the communications interface 456 may enable Wi-Fi (e.g., 802.11) or Bluetooth connections between the audio processing device 400 and one or more local devices, such as mobile device 484, or a wireless router providing network access to a remote server 482, such as through the network 480. In various embodiments, the communications interface 456 may include other wired and wireless communications components facilitating direct or indirect communications between the audio processing device 400 and one or more other devices.

Figure 5:
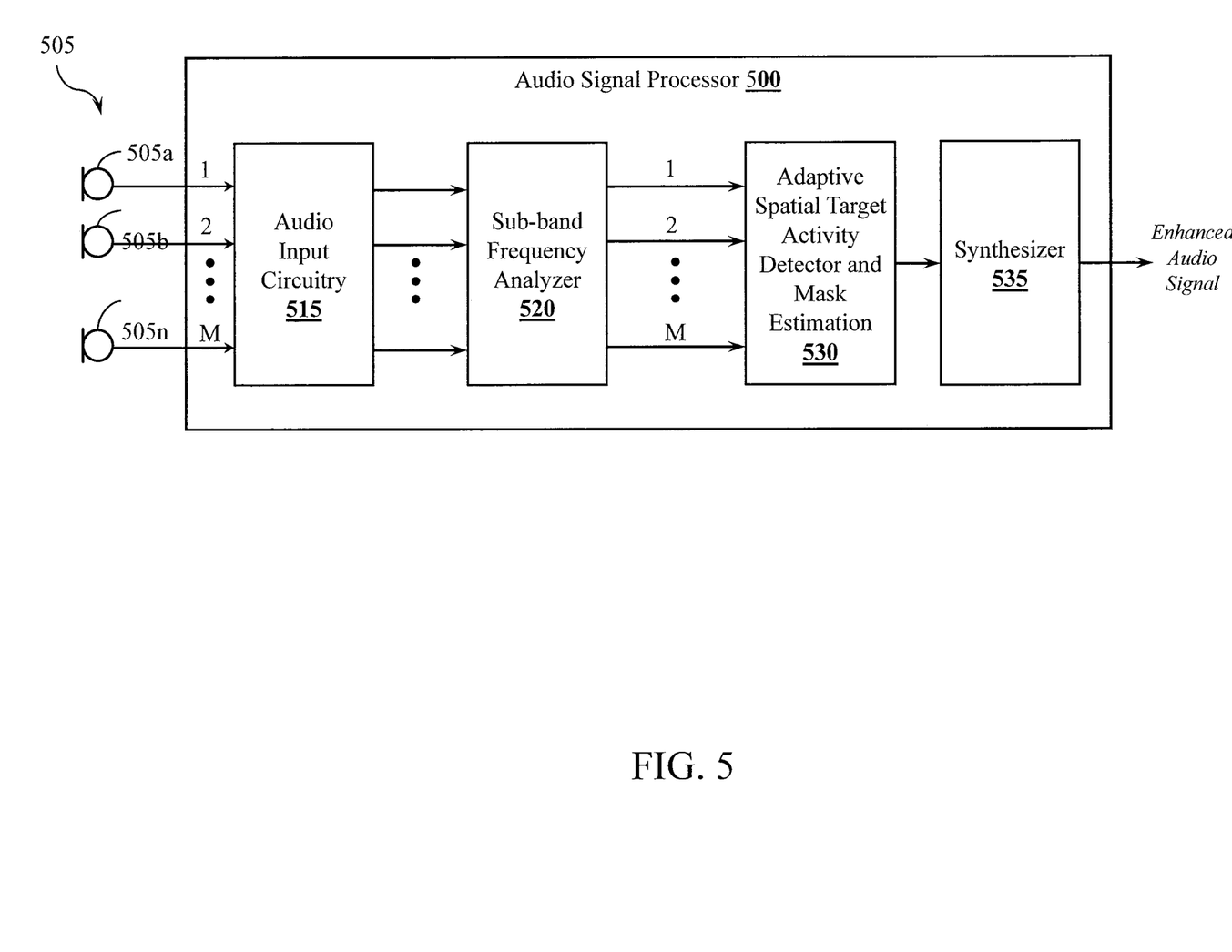
FIG. 5 illustrates an example audio signal processing system implementing adaptive spatial voice detection, in accordance with one or more embodiments of the present disclosure.

FIG. 5 illustrates an audio signal processor 500 according to various embodiments of the disclosure. In some embodiments, the audio signal processor 500 is embodied as one or more integrated circuits including analog and digital circuitry and firmware logic implemented by a digital signal processor, such as digital signal processor 424 of FIG. 4. As illustrated, the audio signal processor 500 includes audio input circuitry 515, a sub-band frequency analyzer 520, an adaptive spatial target activity detector and mask estimation module 530, and a synthesizer 535.

The audio signal processor 500 receives a multi-channel audio input from a plurality of audio sensors, such as a sensor array 505 comprising at least one audio sensor 505*a-n*. The audio sensors 505*a*-505*n* may include microphones that are integrated with an audio processing device, such as the audio processing device 400 of FIG. 4, or external components connected thereto.

The audio signals may be processed initially by the audio input circuitry 515, which may include anti-aliasing filters, analog to digital converters, and/or other audio input circuitry. In various embodiments, the audio input circuitry 515 outputs a digital, multichannel, time-domain audio signal having M channels, where M is the number of sensor (e.g., microphone) inputs. The multichannel audio signal is input to the sub-band frequency analyzer 520, which partitions the multichannel audio signal into successive frames and decomposes each frame of each channel into a plurality of frequency sub-bands. In various embodiments, the sub-band frequency analyzer 520 includes a Fourier transform process. The decomposed audio signals are then provided to the adaptive spatial target activity detector and mask estimation module 530.

The adaptive spatial target activity detector and mask estimation module 530 is operable to analyze the frames of one or more of the audio channels and generate a signal indicating whether target audio is present in the current frame. As discussed herein, the target audio may be human speech (e.g., for voice command processing) and the adaptive spatial target activity detector and mask estimation module 530 may be operable to detect the target speech in a noisy environment that includes non-target speech and generate an enhanced target audio signal for further processing, for example, by a host system. In some embodiments, the enhanced target audio signal is reconstructed on a frame-by-frame basis by combing the sub-bands of one or more channels to form an enhanced time-domain audio signal that is sent to a host system, another system component or external device for further processing, such as voice command processing.

Figure 6:
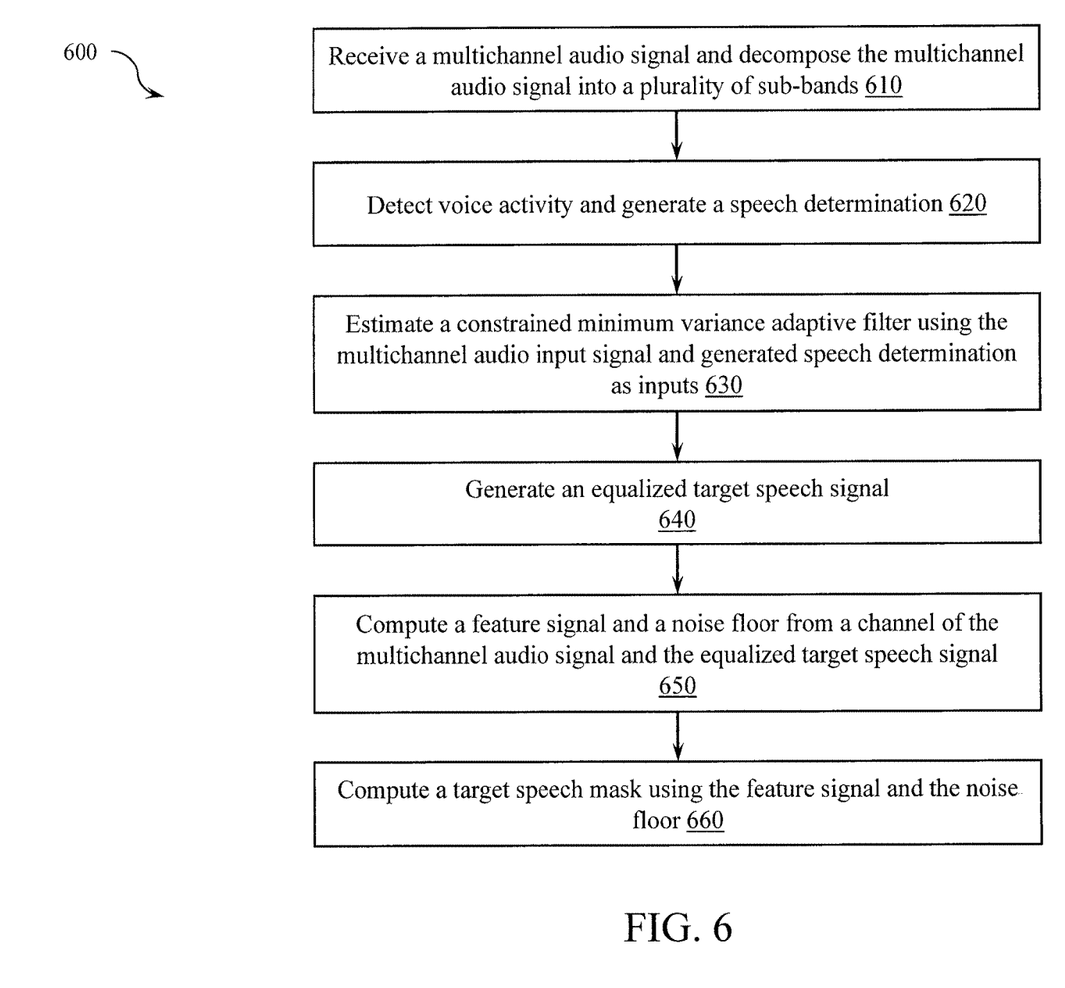
FIG. 6 illustrates an example voice activity detection method, in accordance with one or more embodiments of the present disclosure.

Referring to FIG. 6, embodiments of a method 600 for detecting target voice activity using the systems disclosed herein will now be described. In step 610, the system receives a multichannel audio signal and decomposes the multichannel audio signal into a plurality of sub-bands. The multichannel input signal may be generated, for example, by a corresponding plurality of audio sensors (e.g., a microphone array) generating sensor signals that are processed through audio input circuitry. In some embodiments, each channel is decomposed into a plurality of frequency sub-bands. In step 620, the multichannel audio signal is analyzed, frame-by-frame, to detect voice activity and generate a speech determination for each frame indicating the detection of speech or an absence of speech. In step 630, a constrained minimum variance adaptive filter is estimated using the multichannel audio signal and corresponding speech determination as inputs. In various embodiments, the minimum variance adaptive filter estimates an adaptive filter to minimize the signal variance at its output and generate an equalized target speech signal in step 640. In step 650, a feature signal and noise floor are computed from a channel of the multichannel audio signal and the equalized target speech signal. In step 660, a target speech mask is computed using the feature signal and the noise floor.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
   a first voice activity detector configured to detect speech in a frame of a multichannel audio input signal and output a corresponding speech determination indicating whether speech is detected or absent in the frame;
   a constrained minimum variance adaptive filter configured to receive the multichannel audio input signal and the corresponding speech determination and estimate an adaptive filter to minimize a signal variance at the output of the constrained minimum variance adaptive filter for non-speech frames, thereby producing an equalized target speech signal;
   a mask estimator configured to receive the equalized target speech signal, the multichannel audio input signal, and the speech determination and generate a spectral-temporal mask to discriminate target speech in the multichannel audio input signal from noise and interference speech in the multichannel audio input signal; and
   a second activity voice detector comprising a frame-based spatial voice activity detector configured to detect speech in the frame of the multichannel audio input signal based at least in part on the equalized target speech.

2. The system of claim 1, further comprising an audio input sensor array including a plurality of microphones, each microphone generating a channel of the multichannel audio input signal.

3. The system of claim 2, further comprising a sub-band analysis module configured to decompose each of the channels into a plurality of frequency sub-bands,
   wherein the constrained minimum variance adaptive filter and the mask estimator are configured to process each of the plurality of frequency sub-bands in the received multichannel audio input signal.

4. The system of claim 1, wherein the first voice activity detector further comprises a neural network trained to identify the speech in the frame of the multichannel audio input signal.

5. The system of claim 3, wherein the constrained minimum variance adaptive filter is configured to minimize the signal variance of each frequency sub-band when the speech determination indicates an absence of speech in the frame.

6. The system of claim 1, wherein the constrained minimum variance adaptive filter comprises a normalized least mean square process.

7. The system of claim 2, wherein the mask estimator is further configured to generate a reference feature signal from the multichannel audio input signal and the equalized target speech signal for each sub-band and frame of a selected channel of the multichannel audio input signal.

8. The system of claim 1, wherein the second voice activity detector includes a single-channel power-based voice activity detector that is applied to a reference feature generated from the multichannel audio input signal and the equalized target speech signal.

9. The system of claim 1, wherein the system comprises a speaker, a tablet, a mobile phone, and/or a laptop computer.

10. A method comprising:
    receiving a multichannel audio input signal;
    detecting voice activity, using a first voice activity detector, in a frame of the multichannel audio input signal and generating, by the first voice activity detector, a corresponding speech determination indicating detected speech in the frame or an absence of speech in the frame;
    applying a constrained minimum variance adaptive filter to the multichannel audio input signal and the corresponding speech determination by estimating an adaptive filter to minimize a signal variance at an output of the constrained minimum variance adaptive filter for non-speech frames, thereby producing an equalized target speech signal;
    estimating a spectral-temporal mask using the equalized target speech signal, the multichannel audio input signal and the speech determination to discriminate target speech in the multichannel audio input signal from noise and interference speech in the multichannel audio input signal; and
    detecting, using a second voice activity detector comprising a frame-based voice activity detector, voice activity in the frame of the multichannel audio input signal based at least in part on the equalized target speech.

11. The method of claim 10, wherein receiving the multichannel audio input signal comprises generating the multichannel audio input signal using a plurality of microphones, each microphone generating a corresponding channel of the multichannel audio input signal.

12. The method of claim 11, further comprising: decomposing, using a sub-band analysis module, each of the channels into a plurality of frequency sub-bands.

13. The method of claim 10, wherein detecting the voice activity, using the first voice activity detector, comprises processing the frame of the multichannel audio input signal through a neural network trained to detect the speech or the absence of speech in the frame.

14. The method of claim 12, wherein applying the constrained minimum variance adaptive filter further comprises minimizing the signal variance at the output for each frequency sub-band when the speech determination indicates the absence of speech in the frame.

15. The method of claim 10, wherein applying the constrained minimum variance adaptive filter comprises performing a normalized least mean square process.

16. The method of claim 12, further comprising: generating a reference feature signal for each sub-band and frame of a selected channel based at least in part on the multichannel audio input signal and the equalized target speech signal.

17. The method of claim 10, wherein the second voice activity detector includes a single-channel power-based voice activity detector that is applied to a reference feature generated from the multichannel audio input signal and the equalized target speech signal.

18. The method of claim 10, wherein the method is implemented by a speaker, a tablet, a mobile phone, and/or a laptop computer.

\* \* \* \* \*